(12) United States Patent
Karol et al.

(10) Patent No.: US 10,941,004 B2
(45) Date of Patent: Mar. 9, 2021

(54) LEVEL RIGHT ANGLE TRANSFER MODULE

(71) Applicant: Cornerstone Automation Systems, LLC, Frisco, TX (US)

(72) Inventors: Tom Karol, Frisco, TX (US); Ikram Khan, Frisco, TX (US); Darian Carr, Frisco, TX (US); Richard Steele, Frisco, TX (US)

(73) Assignee: Cornerstone Automation Systems, LLC, Frisco, TX (US)

( * ) Notice: Subject to any disclaimer, the term of this patent is extended or adjusted under 35 U.S.C. 154(b) by 0 days.

(21) Appl. No.: 16/714,261

(22) Filed: Dec. 13, 2019

(65) Prior Publication Data

US 2020/0189852 A1 Jun. 18, 2020

Related U.S. Application Data

(60) Provisional application No. 62/779,214, filed on Dec. 13, 2018.

(51) Int. Cl.
| | | |
|---|---|---|
| *B65G 13/12* | (2006.01) | |
| *B65G 13/07* | (2006.01) | |
| *B65G 13/10* | (2006.01) | |
| *B65G 39/18* | (2006.01) | |

(52) U.S. Cl.
CPC .............. *B65G 39/18* (2013.01); *B65G 13/07* (2013.01); *B65G 13/10* (2013.01); *B65G 13/12* (2013.01)

(58) Field of Classification Search
CPC ........ B65G 13/07; B65G 13/10; B65G 13/12; B65G 39/18; B65G 47/24

USPC ... 198/413, 457.02, 463.3, 607, 780, 781.03
See application file for complete search history.

(56) References Cited

U.S. PATENT DOCUMENTS

| | | | |
|---|---|---|---|
| 3,208,603 A | 9/1965 | Kinker | |
| 5,713,452 A | 2/1998 | Halsted | |
| 6,343,685 B1 * | 2/2002 | Hofer | B65G 47/53 198/370.09 |
| 6,360,869 B1 | 3/2002 | Itoh et al. | |
| 6,505,733 B2 * | 1/2003 | Troupos | B65G 47/54 198/597 |
| 7,287,636 B2 * | 10/2007 | Itoh | B65G 23/08 198/370.1 |
| 8,312,981 B2 * | 11/2012 | Franz | H01L 21/67706 198/370.09 |
| 8,684,169 B2 * | 4/2014 | Itoh | B65G 47/54 198/597 |
| 9,365,361 B1 | 6/2016 | Skarlupka | |

(Continued)

FOREIGN PATENT DOCUMENTS

JP 2014152024 A 8/2014

*Primary Examiner* — Douglas A Hess (57) ABSTRACT

Enclosed herein are embodiments of a product transfer module and product transfer systems. In one embodiment, a product transfer module comprises a first shuttle, the first shuttle including a plurality of rollers, wherein the plurality of rollers are connected by one or more belts and includes a plurality of driven rollers and at least one driving roller; a second shuttle, the second shuttle including a plurality of rows of pulleys and a pulley drive positioned beneath the plurality of pulleys; and a cam system for raising and lowering the first and second shuttles; wherein the first shuttle directs product flow along a first flow path and the second shuttle directs product flow in a second flow direction.

19 Claims, 6 Drawing Sheets

(56) References Cited

U.S. PATENT DOCUMENTS

| | | | |
|---|---|---|---|
| 10,053,300 B2 * | 8/2018 | Itoh | B65G 13/10 |
| 10,464,756 B2 * | 11/2019 | Itoh | B65G 17/48 |
| 2016/0083196 A1 | 3/2016 | Dugat | |
| 2016/0229644 A1 | 8/2016 | Itoh et al. | |

* cited by examiner

LEVEL RIGHT ANGLE TRANSFER MODULE

CROSS-REFERENCE TO RELATED APPLICATION

This application claims the benefit of U.S. Provisional Application Ser. No. 62/779,214, filed by Tom Karol, et al. on Dec. 13, 2018, entitled "LEVEL RIGHT ANGLE TRANSFER MODULE," commonly assigned with this application and incorporated herein by reference in its entirety.

TECHNICAL FIELD

This application is directed to product sorting and transfer systems, and more particularly, a transfer module which may be used in a product transfer system for transferring products at or about a 90 degree angle, and on a level plane to provide product flow in perpendicular directions.

BACKGROUND

Retail supply chains have evolved rapidly over the past 20 years. In part, the evolution of supply chains has been due to the complex nature of this branch of logistics that has been affected by factors such as, e.g., the growth in e-commerce to the move to omni-channel distribution. Retail Distribution Centers and Retail Warehouses provide the backbone for the retail supply chain. With the constant push for shorter lead times in the retail industry, the retailers have grown more demanding of their equipment suppliers to produce more efficient product handling equipment. The next generation of product handling equipment is expected to be more flexible to handle different types of product such as crates, boxes, totes, etc., of different shapes and sizes without adversely affecting the orientation of the product.

One of the critical aspects of product flow inside a warehouse or distribution center is the ease of transfer as product moves from one piece of equipment to another. A well-engineered transfer can greatly enhance the speed and accuracy of the overall system, whereas an inefficient transfer can lead to bottlenecks in the system, causing product pile ups and jams.

BRIEF DESCRIPTION

Reference is now made to the following descriptions taken in conjunction with the accompanying drawings, in which.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. When used with respect to a processor or controller, "configured to" is interpreted as constructed to and/or designed to perform a designated instruction, task, or function. The description and drawings included herein merely illustrate the principles of the disclosure. It will thus be appreciated that those skilled in the art will be able to devise various arrangements that, although not explicitly described or shown herein, embody the principles of the disclosure and are included within its scope.

Supply chains need a smooth and efficient product transfer system that can provide a level product transfer, wherein a product enters and exits the transfer system at substantially the same height without ever being lifted or lowered, and may also be transferred in multiple directions. As such, disclosed herein are aspects of a transfer module that may be used with a product transfer system that can provide a smooth, efficient, and level product transfer, wherein a product enters and exits the transfer system at substantially the same height, and may also be transferred in multiple directions. The product may enter and exit the product transfer system without ever being lifted or lowered in some embodiments. Substantially the same height, plane, or substantially level as used herein means, in some embodiments, within about 0-5 degrees of the same plane.

The transfer module, in some embodiments, may be a right-angle transfer section, wherein the product enters the transfer module and turns, in some embodiments, right or left at an angle, such as right angle, to transfer to one or more different conveyors. Each transfer module may include one or more camshafts, in some embodiments, two camshafts, that provide synchronized lifting and lowering of two nested shuttles. Each shuttle may include a plurality of rollers, with a first shuttle effecting movement at along a first flow path and the second shuttle effecting movement along a second flow path, which is substantially perpendicular with the first flow path. The term substantially perpendicular, as used herein, means that the first and second flow paths are within about 10 degrees from perfectly perpendicular of each other. Other embodiments may exist wherein one or both of the flow paths are ideally perpendicular, which means that the first and second flow paths are within about 5 degrees from perfectly perpendicular of each other.

Figure 1:
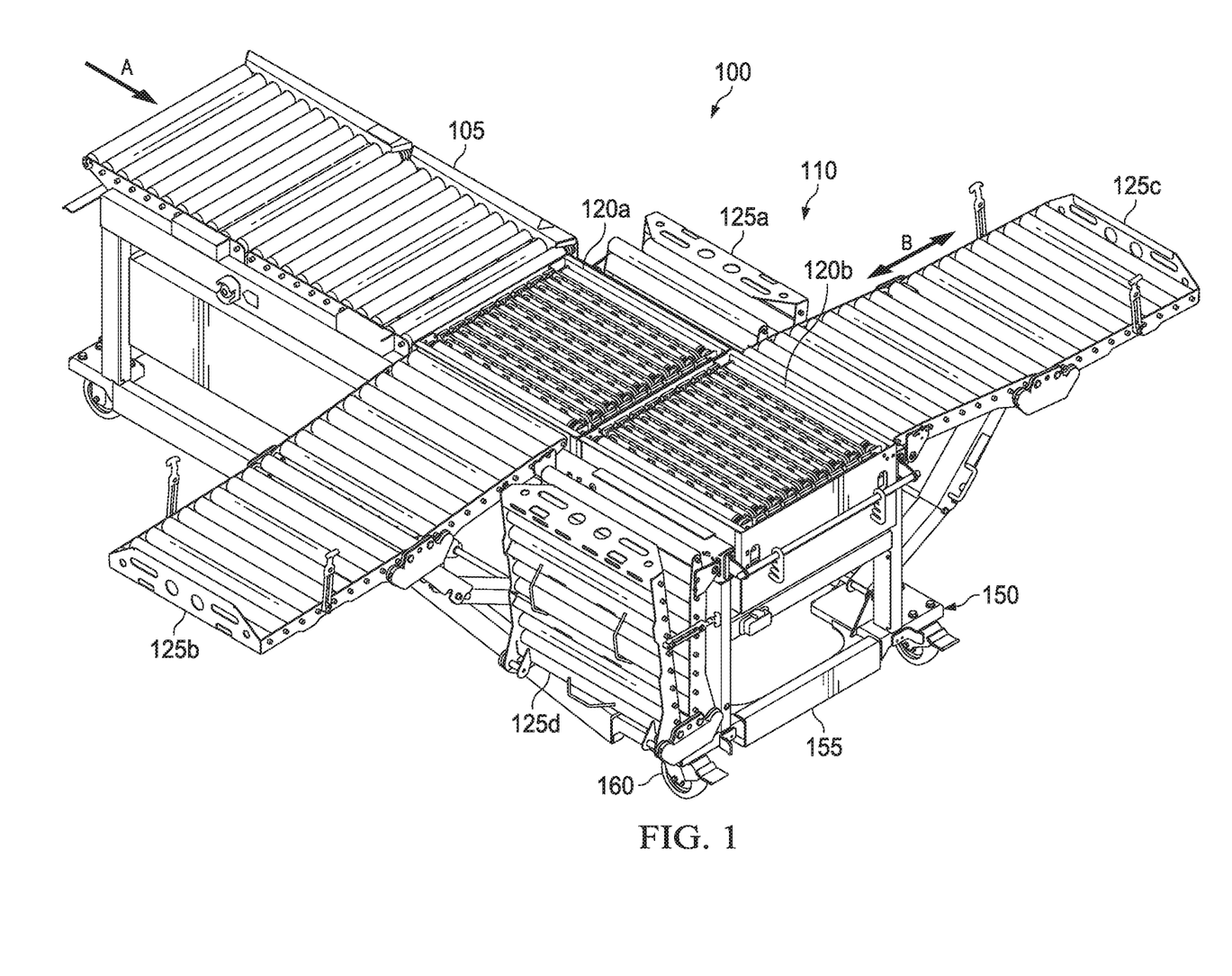
FIG. 1 illustrates a product transfer system employing a transfer module constructed according to the principles of the present disclosure.

Referring to FIG. 1, there is shown a product sortation and moving system 100. In this embodiment, the system 100 includes at least one incoming conveyor 105 and a sorting and transfer system 110 arranged in series. In some embodiments, the system 100 may include a product identification system, such as, e.g., a scanner (not shown) before or coupled with the at least one incoming conveyor 105. The scanner may be a bar code scanner, and in some other embodiments, may be a scanning and sorting module. The at least one incoming conveyor 105 receives product from upstream conveyors connected directly to a delivery truck, or in some embodiments, products may be placed directly onto the at least one incoming conveyor 105. The product then moves through the scanner, which may identify the product and then determine the direction in which the product needs to be redirected in order to be stored at desired location. In some embodiments, the products may be identified based on a product packaging, a bar code, or other identifying tools located on the product which may be used to identify a specific product. The scanner communicates with the sorting and transfer system 110 in order for the sorting and transfer system 110 to direct the product along a desired production direction based on the product identifier. The scanner may communicate with and send signals to the sorting and transfer system 110 in some embodiments via a wireless connection, or in some embodiments, may be a wired connection.

The sorting and transfer system 110 may include one or more transfer modules 120 (120a and 120b). The sorting and transfer system 110 may include one or more controllers such that the sorting and transfer system 110 may receive a signal from the scanner or from another source upstream of the transfer modules 120a and 120b for each product and performs a divert and sort function to direct the product to move in a selected direction from one or more of the transfer modules 120a and 120b. In one embodiment, the sorting and transfer system 110 may include one or more controllers configured for directing movement and sorting of a product according to a signal received from the scanner, and in some embodiments, the transfer modules 120a and 120b may each also include a controller for directing operation of each transfer module 120 according to a signal received from the scanner. The product may then, in some embodiments, move onto one or more product movers 125 (125a-125d) which may connect with the transfer modules 120. Each of the transfer modules 120a and 120b may transfer the product in at least 2 flow paths. The first path may be parallel with an incoming product Flow A. The second path B may be substantially perpendicular with Flow A. A product may travel along Flow path B in either direction, either turning "right" or "left" from flow path A. For example, a first product may enter first transfer module 120a and be directed to product mover 125a, a second product may be directed to product mover 125b, and a third product may continue travelling along flow path A to the second transfer module 120b, for direction to either product mover 125c or product mover 125d. In some embodiments, the transfer modules 120a and 120b may include a support base 150, which may include a plurality of legs 155 and wheels 160 for moving the transfer modules within a warehouse or storage facility. The transfer modules 120a and 120b may then be used in various locations, and stored when not in use, thereby providing more flexibility within the facility and available floor space for other operations within the facility when the transfer modules 120a and 120b are not in use.

While the product sortation and moving system 100 shown in FIG. 1 includes two transfer modules 120a and 120b, there may be some embodiments having only one transfer module 120, and some embodiments have more than two transfer modules 120 according to the amount of products being sorted and moved.

Figure 2:
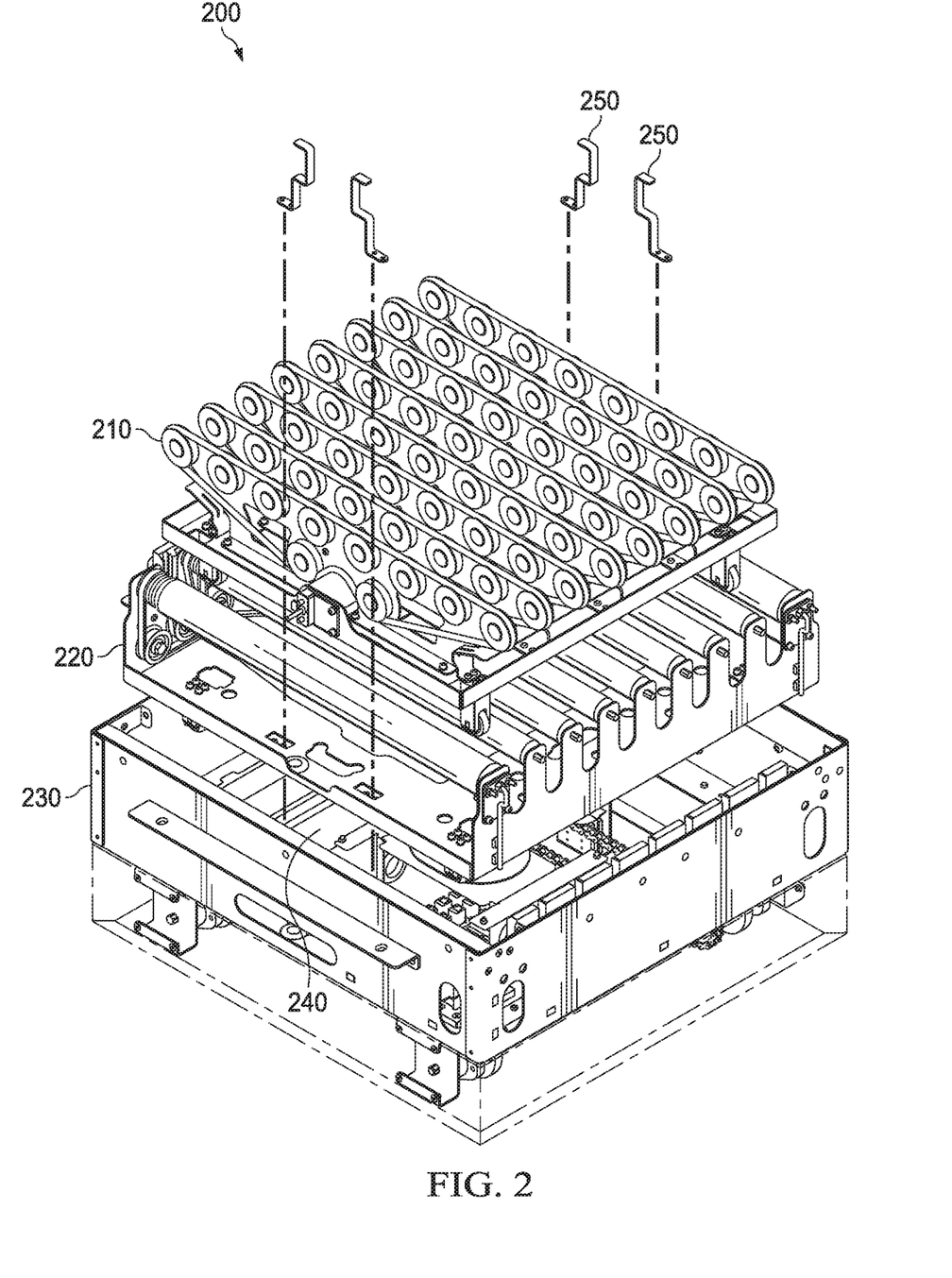
FIG. 2 is an exploded perspective view of one embodiment of a transfer module according to principles of the disclosure.

Referring now to FIG. 2, there is shown one embodiment of a transfer module 200 constructed according to the principles of the disclosure. The transfer module 200 includes a first shuttle 210 and a second shuttle 220 which are nested and configured such that as one of the first and second shuttles 210, 220, is raised to a first plane, at a substantially similar level as the plane of incoming conveyor, the other shuttle is lowered below the first plane. A cam system 230 positioned beneath the first and second shuttles 210, 220, has a plurality of cams positioned radially about a cam shaft 240, the plurality of cams configured to engage the first and second shuttles 210 and 220 to raise them to the first plane and lower them below the first plane. Retaining clips 250 may be used to hold at least part of the transfer module together 200.

Figure 3:
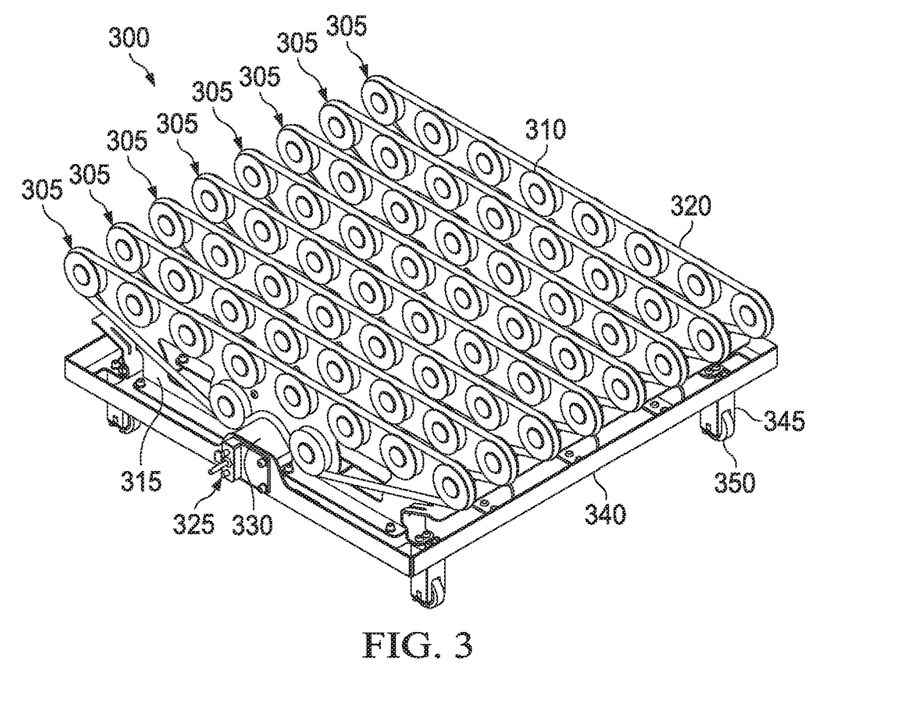
FIG. 3 is perspective view of a first shuttle of the transfer module according to principles of the disclosure.

Referring to FIG. 3, there is shown one embodiment of a first shuttle 300 which may be used in a transfer module such as transfer module 200. First shuttle 300 includes a plurality of rows 305 of pulleys 310 connected by a belt system 325. Each row 305 includes a plurality of pulleys 310, supported on a frame 315 and connected by a belt 320. In the embodiment shown, the first shuttle 300 includes 8 rows 305, wherein each row 305 includes a series of 8 pulleys 310. The belt system 325, in this embodiment, includes a powered roller 330, which may be positioned beneath the rows 305, wherein the powered roller 330 may engage the rows 305 of pulleys 310 and belts 320. The frame 340 may include one or more mounting blocks 345 positioned beneath the rows of pulleys, the mounting blocks for engaging the cam system. In some embodiments, the mounting blocks 345 may include sliders 350 which may engage one or more cams of the cam system, such as cam system 230.

Figure 4:
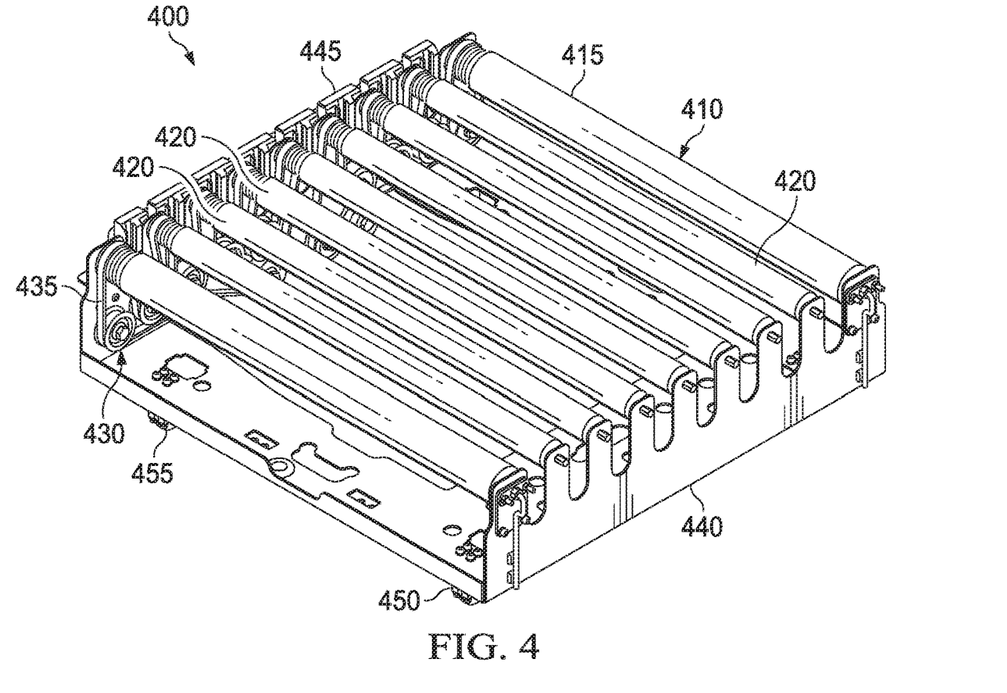
FIG. 4 is a perspective view of a second shuttle of the transfer module according to principles of the disclosure.

Referring now to FIG. 4, there is shown an embodiment of a second shuttle 400 which may be used in a transfer module such as transfer module 200. The second shuttle 400 may include a plurality of rollers 410, wherein the plurality of rollers 410 includes one or more driving (powered or motorized) rollers 415 and a plurality of driven rollers 420. In the embodiment shown, the second shuttle 400 includes two driving or powered rollers 415 with seven driven (or idle) rollers 420 positioned in parallel there between. The plurality of rollers 410 may be connected through a belt system 430, such as a network of serpentine belts 435 as shown in FIG. 4, wherein the driving rollers and the belt system cooperate to rotate the driven rollers of the plurality of rollers. A mounting frame 440 supports the plurality of rollers. The mounting frame 440 may include support members 445 along each side of the mounting frame 440 for supporting each of the plurality of rollers 410 therebetween. The mounting frame 440 may include mounting blocks 450 for engaging a cam system, such as cam system 230. In the embodiment shown, the mounting blocks 450 include sliders 455.

The first shuttle 300 and second shuttle 400 may be positioned within the transfer module such that each of the first and second shuttles 300 and 400 can move freely in a vertical motion, from the first plane, substantially equal with the plane of incoming conveyor 120 and a plane beneath the first plane.

Figure 5:
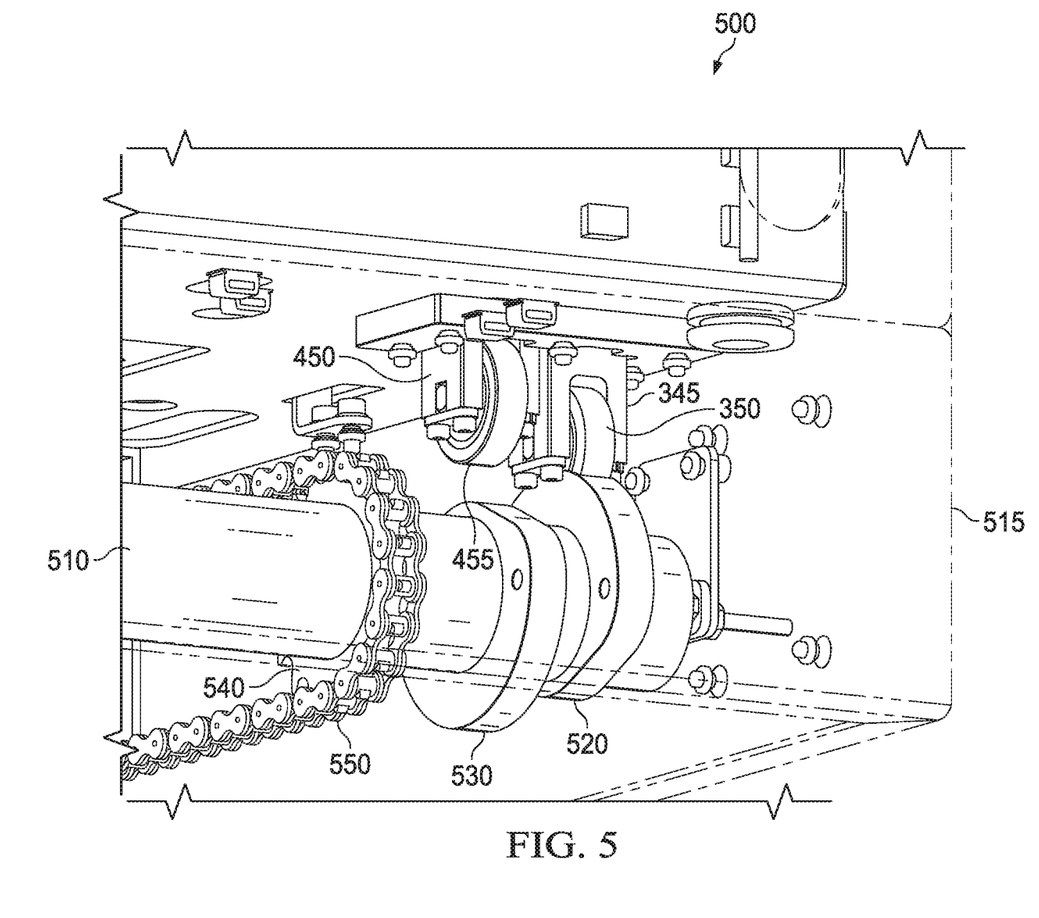
FIG. 5 illustrates a cam mechanism which may be used to raise or lower the first or second shuttles according to principles of the disclosure.
Figure 6:
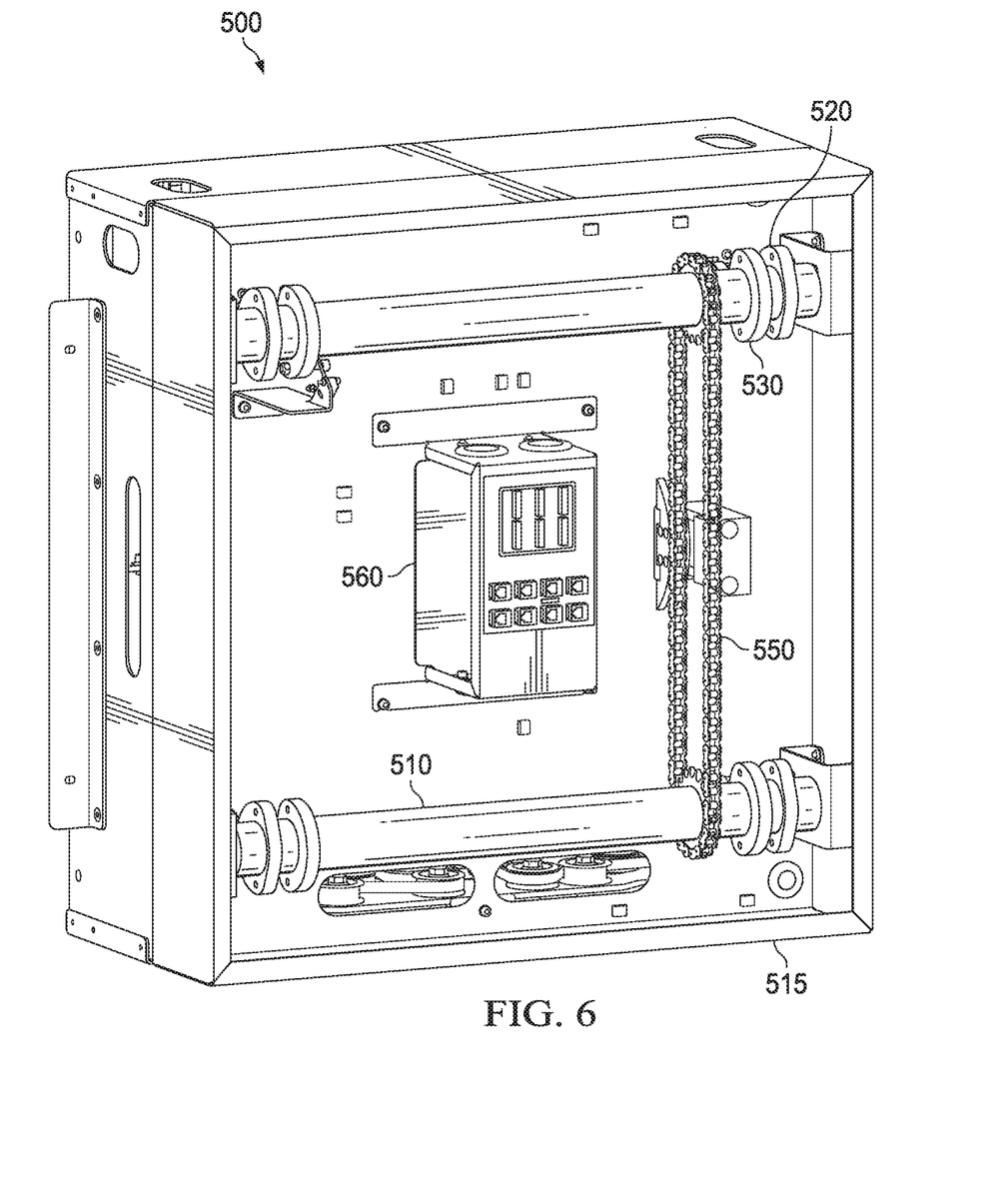
FIG. 6 illustrates a bottom side of the transfer module and one embodiment of a cam system according to principles of the disclosure.

Referring now to FIGS. 5-6, there is shown embodiments of a cam system 500 which may be used in embodiment of a transfer module, such as transfer module 200. In one embodiment, the cam system 500 may include one or more cam rollers 510 positioned within a frame 515. In some embodiments, the cam rollers 510 may be hexagonal cam rollers, and in some embodiments, there may be two cam rollers 510, such as illustrated in FIG. 5. Each of the cam rollers 510 has at least one pair of first cam 520 and second cam 530 disposed at different positions thereon. In the embodiment shown, each cam roller 510 has two pairs of a first cam 520 and a second cam 530 positioned at opposing ends. In each pair, the first and second cams 520 and 530 may be out of phase relative to each other, in some embodiments by about 180° such that first cam 520 engages the first shuttle 300 of the transfer module for vertical movement, and the second cam 530 engages the second shuttle 400 for vertical movement. As the first cam 520 raises the first shuttle 300 upward, the second shuttle 400 moves downward relative to the first shuttle 300. Likewise, when the second cam 500 raises the second shuttle 400 upward, the first shuttle 300 moves downward relative to the second shuttle 400.

The cam rollers 510 may be powered by a motor (not shown), such as, e.g., a 24 VDC gear motor. In some embodiments, a chain sprocket 540 mounted radially about the cam rollers 510 may connect to a drive associated with the motor via a roller chain 550. A processor or controller 560 may communicate with the motor to rotate the one or more cam rollers 510 such that the first cam 520 may engage the first shuttle 400 and the second cam 530 may engage the second shuttle 500 in order to move them up and down vertically. The controller 560 may also communicate with a product identification system, such as, e.g., a scanner, such as discussed above with respect to FIG. 1, to direct the operation of the cam system. Conventional wireless or wired communication means can be used between the sorting system and the controller of the transfer module. In this embodiment, the controller 560 is shown mounted with the frame 515 of the cam system 500, but in other embodiments, may be located in various alternate locations of the transfer module, or in some embodiments, may include one or more remote components that may communicate with the controller wirelessly.

As shown in FIG. 6, the mounting blocks 345 of the first shuttle 300 and the mounting block 450 of the second shuttle and 400 may be located proximate the first and second cams 520 and 530. As the cam roller 510 rotates, the first cam 520 may engage the mounting block 345 and more specifically, engage the slider 350 of the first shuttle 300 in positive contact in order to raise the first shuttle upward. As the cam roller 510 continues to rotate, the second cam 530 may engage the mounting block 450 and more specifically, the slider 455, of the second shuttle 400 in positive contact in order to raise the second shuttle 400 upward as the first shuttle 300 is lowered. The first shuttle 300 and second shuttle 400 may be nested such that the rows 305 of pulleys will be positioned between each of the plurality of rollers 410 when the first shuttle 300 and the second shuttle 400 are at a same height vertically relative to each other. The same height, as used herein means the plurality of rollers 410 and the rows 305 of pulleys are within 5-10 degrees of a plane relative to each other. The first and second cams 520 and 530 may be offset from each other, in some embodiments by about 180°, such that only one shuttle is engaged by either the first and second cam 520 and 530 at a given time. In other embodiments, the first and second cams 520 and 530 may be offset from each other by about 160-200 degrees. Accordingly, the first shuttle 300 and the second shuttle 400 alternately reciprocate in a vertical direction. As the first cam 520 is up, the first shuttle 300 is pushed vertically upward, while the second shuttle 400 is lower than the first shuttle 300. Likewise, when the second cam 530 engages the second shuttle 400, the second shuttle 400 is pushed vertically upward while the second shuttle 300 is lowered.

The the plurality of rollers 410 and the rows 305 of pulleys 310 may alternate between a top/highest plane in order for a product, such as a tote, box or crate, etc may not be substantially raised or lowered when it passes over the pulleys 310 and/or plurality of rollers 410. The product may accordingly can enter and exit the transfer module at about the same plane and what is generally called the "water-fall effect" may be minimizes or eliminated as the product passes through the one or more transfer modules. Thus, a smooth and efficient product transfer may be achieved to transfer boxes, totes crates, etc. within a product transfer system, such as system 100.

Figure 7:
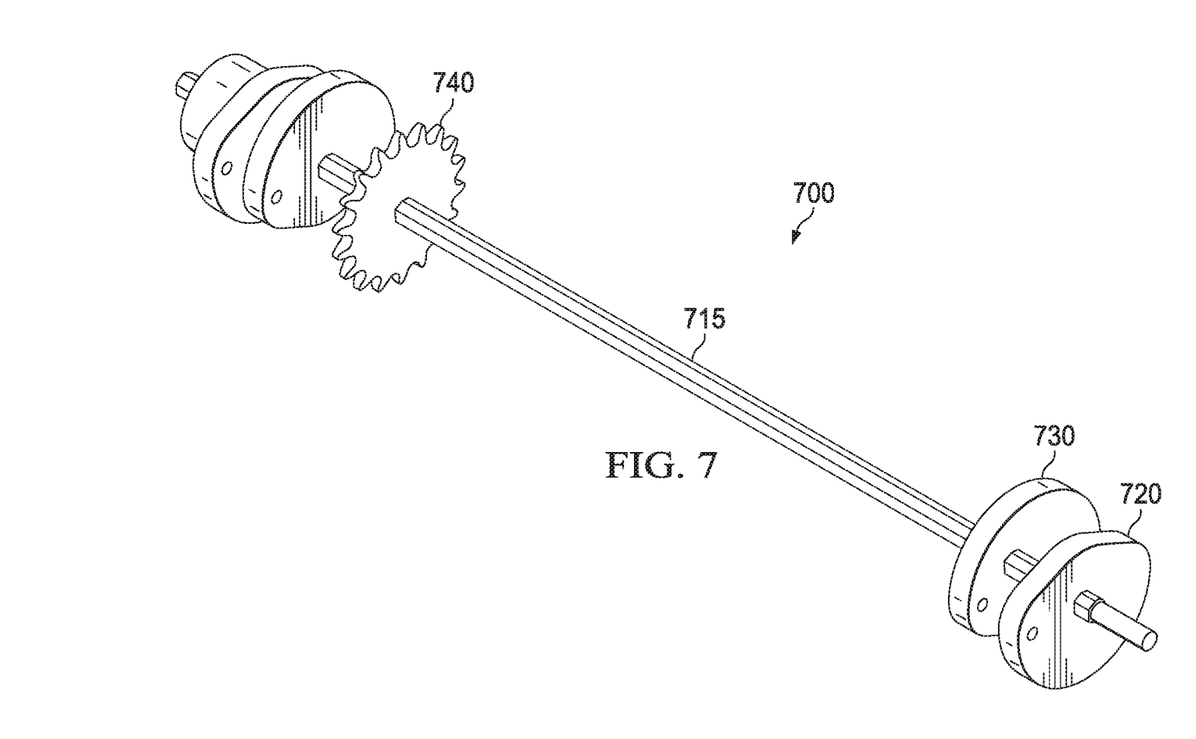
FIG. 7 illustrates another embodiment of a cam roller which may be used with the transfer module according to principles of the disclosure.

Referring now to FIG. 7, there is shown another embodiment of a cam roller 710. The cam roller 710 may include a hexagonal cam shaft 715 with first cams 720 and second cams 730 near opposing ends of the cam shaft 715. A chain sprocket 740 may be coupled about the cam shaft 715 for engaging a chain driven by a motor, for rotation of the cam shaft 715 and the first and second cams 720 and 730.

A transfer module of a product transfer system such as system 100, such as the right-angle transfer module, such as transfer module 200, according to the disclosure, may provide change of product direction during the distribution process. The right-angle transfer module according to principles of the disclosure may provide product flow in four directions. However, the ease of product flow through a system depends on efficiency of product transfer mechanisms, such that the product rate and orientation are not adversely altered. In a right-angle transfer module, a product may be more efficiently transferred relative to traditional transfer modules by maintaining the product at a substantially same level or height while the product is atop the transfer module. The transfer module as disclosed herein includes nested first and second shuttles that may be reciprocated vertically through a pre-determined distance. While one shuttle includes a plurality of belt driven pulleys, the other shuttle includes a plurality of rollers. The shuttles are arranged such that the belt driven pulleys can displace the product along the axis of the system while the set of rollers displace the product in a direction substantially perpendicular to the axis of the conveyor. By synchronizing the motion of the cam driven shuttles that peak at a same plane, the product may efficiently enter and exit a right-angle transfer module at the same height in a pre-determined direction.

Those skilled in the art to which this application relates will appreciate that other and further additions, deletions, substitutions and modifications may be made to the described embodiments.

A portion of the above-described apparatus, systems or methods, such as the transfer module controller, may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/ or read-only memory (ROM), to enable various types of digital data processors or computers to perform one, multiple or all of the steps of one or more of the above-described methods, or functions, systems or apparatuses described herein.

Portions of disclosed embodiments, such as the transfer module controller and the cam system controller, may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Embodiments of transfer modules according to the disclosure may include the following aspects and features:

In one aspect, there may be transfer module, the transfer module comprising: a first shuttle, including a plurality of rollers supported on a support tray, wherein the plurality of rollers includes at least two driving rollers and a plurality of driven rollers, wherein the plurality of rollers are connected by one or more belts; a second shuttle, including a plurality of pulleys, wherein the pulleys are driven by a pulley drive positioned beneath the plurality of pulleys; and a cam system for raising and lowering the first and second shuttles. The cam system may include at least one cam shaft having a first and second cam at each end, wherein the first and second cams are configured out of phase with each other; a motor for driving the cam shaft; and a processor for directing operation of the cam system. The first and second shuttles may be nested such that they may be raised and lowered relative to each other to affect movement of product along at least two flow paths. In some embodiments, the cam system may include a second cam shaft having a first and second cam at each end, wherein the first and second cams are out of phase with each other.

In another aspect, there may be a right-angle transfer system comprising: a hexagonal cam shaft with 2 pairs of cams mounted on it at pre-determined locations. In each pair of cams, the two cams are offset, in some embodiments, by about 180°, wherein the hexagonal cam shaft also carries two roller chain sprockets welded at pre-determined locations. In some embodiments, a 24 VDC gear motor connects to the drive sprockets through roller chains, thereby providing the drive for the hexagonal shaft. The transfer system further includes a first shuttle, the first shuttle including a plurality of rows of pulleys, wherein each of the pulleys in the row of pulleys are positioned in series. In some embodiments, there may be 8 rows of pulleys and 8 pulleys in each row. The pulleys in each row may be connected by a drive belt. A motorized roller placed underneath the pulleys may drive and engage the drive belt. The transfer system further includes a second shuttle, the second shuttle may include a plurality of rollers, wherein the plurality of rollers includes a plurality of driven rollers and one or more driving rollers. In some embodiments, the plurality of rollers includes two driving rollers and seven driven rollers, wherein the driving rollers are motorized and the driven rollers are idle, wherein the driven rollers are driven by the driving rollers through a belt system. The belt system includes a series of serpentine belts which may connect the rollers.

In some embodiments, the first and second shuttles are provided with bearing mounted sliders at the base thereof such that they are placed in close proximity to the cams, which are mounted on hexagonal cam shaft. In other embodiments, when the hexagonal cam shaft rotates, the rotating cams engage the sliders and provide a positive thrust to one of the first and second shuttles, allowing it to reciprocate vertically through a predetermined distance. The cams are out of phase with each other, in some embodiments by about 180°, such that the first and second shuttles reciprocate alternatively.

In some embodiments, the maximum distance travelled by each shuttle is such that product carrying planes of the two shuttles at the points of maximum displacement will be co-planar. The highest product carrying plane of each shuttle will be at the same height with respect to the ground level. By providing co-planar product carrying planes on each shuttle, the product may remain at substantially the same height across the transfer module, and is not lifted or lowered while positioned on the transfer module such that he product enters and exits the transfer module at substantially the same height.

Aspects disclosed herein include:

A: A transfer module, the transfer module comprising: a first shuttle, the first shuttle including a plurality of rollers, wherein the plurality of rollers are connected by one or more belts and includes a plurality of driven rollers and at least one driving roller; a second shuttle, the second shuttle including a plurality of rows of pulleys and a pulley drive positioned beneath the plurality of pulleys; and a cam system for raising and lowering the first and second shuttles; wherein the first shuttle directs product flow along a first flow path and the second shuttle directs product flow in a second flow direction.

B: A product transfer system, the system comprising: at least one incoming conveyor; a product scanner; and a product transfer module, the product transfer module comprising: a first shuttle, the first shuttle including a plurality of rollers, wherein the plurality of rollers are connected by one or more belts and includes a plurality of driven rollers and at least one driving roller; a second shuttle, the second shuttle including a plurality of rows of pulleys and a pulley drive positioned beneath the plurality of pulleys; a cam system for raising and lowering the first and second shuttles; and a controller for communicating with the product scanner; wherein the first shuttle directs product flow along a first flow path and the second shuttle directs product flow in a second flow direction.

Aspects A and B may have one or more of the following additional elements in combination:

Element 1: wherein the first and second shuttles are nested with each other, such that they may be raised and lowered relative to each other to affect movement of product along the first and second flow paths;

Element 2: wherein the first flow path and the second flow path are substantially perpendicular to one another;

Element 3: further comprising a support base, the support base including a plurality of legs and wheels;

Element 4: wherein the cam system includes: at least one cam shaft having at least at least two pairs of a first cam and a second cam on end of the cam shaft; a sprocket positioned radially about the cam shaft; a motor; a chain connected with the motor and the sprocket; and a processor for directing operation of the cam system;

Element 5: wherein the first cam is configured to engage the first shuttle and the second cam is configured to engage the second shuttle;

Element 6: wherein the first and second cams are configured out of phase with each other;

Element 7: wherein the first and second cams are out of phase with each other by about 180 degrees;

Element 8: further comprising a controller;

Element 9: wherein the first shuttle further includes: a support tray, the support tray including a plurality of support members for supporting each of the plurality of rollers on both ends of the each roller; and two or more mounting blocks and sliders, the mounting blocks and sliders configured to engage the cam system to affect vertical movement of the first shuttle;

Element 10: wherein the pulley drive includes a shaft positioned beneath and substantially perpendicular with the plurality of pulleys, the shaft configured to drive a belt system connecting the plurality of rows of pulleys; and Element 11: wherein the second shuttle further includes a support frame for supporting each of the rows of pulleys, the frame including two or more mounting blocks and sliders, the mounting block and sliders configured to engage the cam system to affect vertical movement of the second shuttle.

What is claimed is:

1. A transfer module, the transfer module comprising:
a first shuttle, the first shuttle including a plurality of rollers, wherein the plurality of rollers are connected by one or more belts and includes a plurality of driven rollers and at least one driving roller;
a second shuttle, the second shuttle including a plurality of rows of pulleys and a pulley drive positioned beneath the plurality of pulleys; and
a cam system for raising and lowering the first and second shuttles, wherein the cam system includes at least one cam shaft having at least at least two pairs of a first cam and a second cam near opposing ends of the cam shaft, wherein the first cam is configured to engage the first shuttle and the second cam is configured to engage the second shuttle;
wherein the first shuttle directs product flow along a first flow path and the second shuttle directs product flow in a second flow direction.

2. The transfer module according to claim 1, wherein the first and second shuttles are nested with each other, such that they may be raised and lowered relative to each other to affect movement of product along the first and second flow paths.

3. The transfer module according to claim 2, wherein the first flow path and the second flow path are substantially perpendicular to one another.

4. The transfer module according to claim 1, further comprising a support base, the support base including a plurality of legs and wheels.

5. The transfer module according to claim 1, wherein the cam system further includes:
a sprocket positioned radially about the cam shaft;
a motor;
a chain connected with the motor and the sprocket; and
a processor for directing operation of the cam system.

6. The transfer module according to claim 1, wherein the first and second cams are configured out of phase with each other.

7. The transfer module according to claim 6, wherein the first and second cams are out of phase with each other by about 180 degrees.

8. The transfer module according to claim 1, further comprising a controller.

9. The transfer module according to claim 1, wherein the first shuttle further includes:
a support tray, the support tray including a plurality of support members for supporting each of the plurality of rollers on both ends of the each roller; and
two or more mounting blocks and sliders, the mounting blocks and sliders configured to engage the cam system to affect vertical movement of the first shuttle.

10. The transfer module according to claim 1, wherein the pulley drive includes a shaft positioned beneath and substantially perpendicular with the plurality of pulleys, the shaft configured to drive a belt system connecting the plurality of rows of pulleys.

11. The transfer module according to claim 1, wherein the second shuttle further includes a support frame for supporting each of the rows of pulleys, the frame including two or more mounting blocks and sliders, the mounting block and sliders configured to engage the cam system to affect vertical movement of the second shuttle.

12. A product transfer system, the system comprising:
at least one incoming conveyor;
a product scanner; and
a product transfer module, the product transfer module comprising:
a first shuttle, the first shuttle including a plurality of rollers, wherein the plurality of rollers are connected by one or more belts and includes a plurality of driven rollers and at least one driving roller;
a second shuttle, the second shuttle including a plurality of rows of pulleys and a pulley drive positioned beneath the plurality of pulleys;
a cam system for raising and lowering the first and second shuttles; and
a controller for communicating with the product scanner;
wherein the first shuttle directs product flow along a first flow path and the second shuttle directs product flow in a second flow direction.

13. The product transfer system according to claim 12, wherein the first and second shuttles are nested with each other, such that they may be raised and lowered relative to each other to affect movement of product along the first and second flow paths, wherein the first flow path and the second flow path are substantially perpendicular to one another.

14. The product transfer system according to claim 12, wherein the transfer module further includes a support base, the support base including a plurality of legs and wheels.

15. The product transfer system according to claim 12, wherein the cam system includes:
at least one cam shaft having at least at least two pairs of a first cam and a second cam near opposing ends of the cam shaft;
a sprocket positioned radially about the cam shaft;
a motor;
a chain connected with the motor and the sprocket; and
a processor for directing operation of the cam system, the processor configured to communicate with the controller.

16. The product transfer system according to claim 15, wherein the first cam is configured to engage the first shuttle and the second cam is configured to engage the second shuttle.

17. The product transfer system according to claim 16, wherein the first and second cams are configured out of phase with each other by about 180 degrees.

18. The product transfer system according to claim 12, wherein the first shuttle further includes:
- a support tray, the support tray including a plurality of support members for supporting each of the plurality of rollers on both ends of the each roller; and
- two or more mounting blocks and sliders, the mounting blocks and sliders configured to engage the cam system to affect vertical movement of the first shuttle.

19. The product transfer system according to claim 12, wherein the pulley drive includes a shaft positioned beneath and substantially perpendicular with the plurality of pulleys, the shaft configured to drive a belt system connecting the plurality of rows of pulleys, and wherein the second shuttle further includes a support frame for supporting each of the rows of pulleys, the frame including two or more mounting blocks and sliders, the mounting block and sliders configured to engage the cam system to affect vertical movement of the second shuttle.

\* \* \* \* \*